United States Patent [19]
Satzinger

[11] 3,842,939
[45] Oct. 22, 1974

[54] GREASE BOX FOR DISPENSING LUBRICANT
[75] Inventor: Roland Satzinger, Euerdorf, Germany
[73] Assignee: Gebhard Satzinger Metallwarenfabrik, Bad Kissingen, Germany
[22] Filed: Aug. 7, 1972
[21] Appl. No.: 278,315

[30] Foreign Application Priority Data
Aug. 9, 1971  Germany............................ 2139771

[52] U.S. Cl.................................. 184/39, 222/389
[51] Int. Cl............................. F16n 5/00, B67d 5/44
[58] Field of Search .......... 184/14, 39, 45; 222/386, 222/389; 277/212 C

[56] References Cited
UNITED STATES PATENTS
2,754,931  7/1956  Riker .................................. 184/14
3,244,333  4/1966  Kohn et al. .......................... 222/389
3,430,731  3/1969  Satzinger ............................. 184/39

FOREIGN PATENTS OR APPLICATIONS
901,161  7/1962  Great Britain ....................... 184/45

Primary Examiner—Manuel A. Antonakas
Attorney, Agent, or Firm—Burgess, Dinklage & Sprung

[57] ABSTRACT

An improvement in a grease box comprising a casing having a closed expandable hollow body therein, said hollow body containing electrolytic fluid into which a galvanic element is advanceable to produce gas under pressure to effect expansion of said hollow body which in turn effects dispensation of lubricant out of a chamber in said grease box, which improvement comprises a slidingly displaceable insert within said casing, a lip seal disposed between said insert and said casing, said insert engageable by the wall of said hollow body.

6 Claims, 3 Drawing Figures

PATENTED OCT 22 1974           3,842,939

GREASE BOX FOR DISPENSING LUBRICANT

BACKGROUND OF THE INVENTION

1. Field of the Invention

This invention relates to a grease box for automatically dispensing lubricant. More particularly, it relates to a grease box for dispensing lubricant of the type shown in German Pat. No. 1,256,001 and U.S. Pat. No. 3,430,731. In these prior art grease boxes, there is disposed an expandable hollow body containing an electrolytic fluid into which a galvanic element is advanceable to generate gas under pressure. The gas under pressure builds up in the hollow body causing the hollow body to expand. The expansion of the hollow body caused by expanding a resilient rubber-like wall effects displacement of lubricant maintained in an adjacent chamber out of the grease box to the point of lubrication.

2. Discussion of the Prior Art

There has been abstracted above, briefly, the type of lubricating device to which the present invention is directed. Unfortunately, grease boxes of the type heretofore provided have suffered from the disadvantage that the expandable hollow body, though fluid-tight is not always gas-tight, and there can be effected the escape of gas employed to generate pressure through the walls of the expanded hollow body. Thus, the gas comes into direct contact with the lubricant disposed beneath the wall of the expandable hollow body. This gas escapes through the lubricant outflow channel of the grease box to the point of lubrication, exerting pressure on the lubricant. There can be effected some unintended flow of lubricant to the point of lubrication.

Another decided disadvantage of the prior art type lubricators resides in the fact that the grease is maintained in an opaque body, and it is difficult to tell when the lubricator needs to be refilled or replaced. Specifically, such grease boxes do not provide any indication of when the lubricant is completely or almost completely used up.

It has thus become desirable to provide a grease box of the type of the prior art wherein means are provided to insure that gas does not inadvertently escape from the hollow body to pass through the lubricant. It is also desirable to provide a grease box wherein consumption of the lubricant is indicated in a simple manner. Specifically, it is desirable to provide a grease box wherein merely by glancing at the grease box, it can be determined whether or not the same needs to be refilled or replaced.

SUMMARY OF THE INVENTION

Broadly, this invention contemplates an improvement in a grease box comprising a casing having a closed expandable body therein, said hollow body containing electrolytic fluid into which a galvanic element is advanceable to produce gas under pressure to effect expansion of said hollow body which, in turn, effects dispensation of lubricant out of a chamber in said grease box, the improvement comprising a slidingly displaceable insert within said casing, a lip seal disposed between said insert and said casing, said insert engageable by the wall of the said hollow body. The wall of said hollow body is an expandable wall.

In a particularly desirable embodiment, this invention contemplates such an improved grease box wherein oil is provided as a sealing medium between the dividing insert and the expandable wall of the expandable hollow body.

In an especially desirable embodiment of the invention, there is provided as a bottom wall of the chamber containing a grease a wall made of a transparent material. Such a wall will permit an operator to view a portion of the interior of the grease box. Thus, when the slidingly displaceable insert is lowered due to the movement of the gas and the lack of resistance of grease in the chamber therebeneath, there can be determined that the grease needs to be replaced. Stated another way, once the slidingly displaceable insert becomes visible to an operator, it can be readily determine to what extent the lubricant present within the grease box is sufficient. Generally speaking, once this becomes visible, it is about that time that replacement is in order.

Preferably, the slidingly displaceable insert comprises a number of parts held together by a reinforcing seam, and the lip seal lies between said parts. The lip seal can be made of a resilient material to engage the inside of the outer walls of the grease box to provide a tight fit, yet to allow a sliding displacement of the insert.

The dividing insert, provided with the lip seal, pushes the cylindrical wall of the grease box toward the lubricant outflow channel when the hollow body expands, expanding the expandable wall of the hollow body, and insures that the pressure gases produced in the hollow body become fully effective. Moreover, the dividing insert is safely sealed off from the grease box in a desirable embodiment through use of a sealing medium provided in the form of oil between the expandable hollow body and the dividing insert. Here, the dividing insert is contained in a sealed manner on the cylindrical inner wall of the grease box by means of a lip seal.

The dividing insert, as will be seen from the description below, also forms a mechanical protection for the closed expandable hollow body, so that the latter cannot be damaged by an unauthorized person by, for example, pushing a sharp object through the lubricant outflow channel. The end part of the grease box, desirably funnel-shaped at the point of connection for lubricant outflow, as stated above, is preferably made of a transparent material. Thus, when the grease box has run out of lubricant or is almost empty, the parts of the dividing insert which come into contact with the end part of the casing become visible, thereby providing an optical indication of the state of exhaustion of the lubricant. The parts of the dividing insert, which come into contact with the end part of the grease box, can in an alternative embodiment be sprung on the dividing insert.

In a desirable embodiment of the present invention, the parts of the dividing insert are held together with the lip seal disposed therebetween through use of a reinforcing seam.

BRIEF DESCRIPTION OF THE DRAWINGS

The present invention can be more readily understood and appreciated when reference is made to the accompanying drawings, in which.

DESCRIPTION OF SPECIFIC EMBODIMENT

Figure 1:
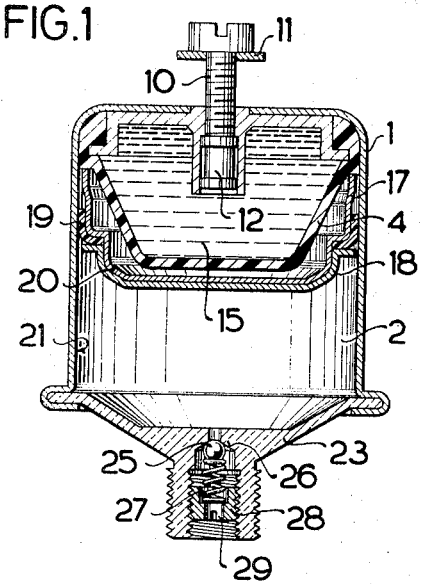
FIG. 1 is a side elevation, partly in section, showing a grease box for automatically dispensing lubricant. There is provided a dividing insert in the starting position with an end part, funnel-shaped, made of a transparent material. The end part made of transparent material is also shown in section.
Figure 2:
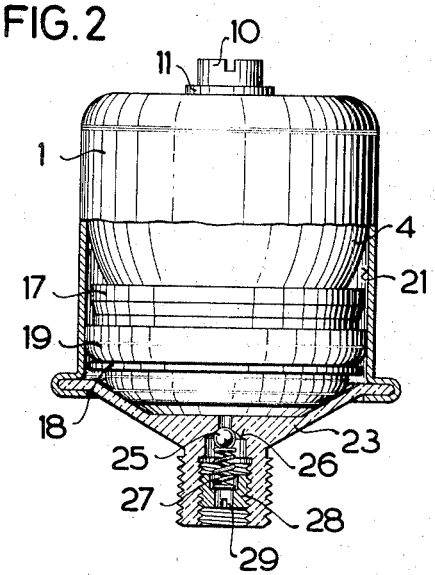
FIG. 2 is a similar side elevation showing different parts in section. It is also of the grease box of the present invention, when the grease box is empty of grease. Here, the dividing insert rests against the transparent funnel-shaped end part.
Figure 3:
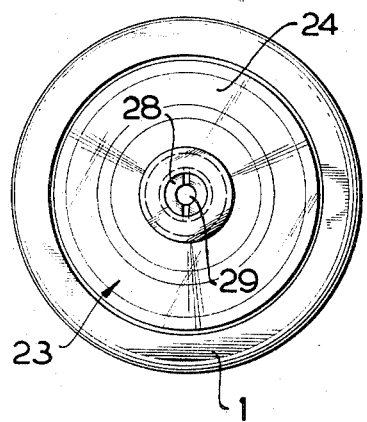
FIG. 3 is a view from the bottom of the grease box showing the transparent end part, the thread lug for connecting the grease box to the lubricating area and the contact area.

A desirable embodiment of the present invention is illustrated in the accompanying drawings in which grease box 1 has a tightly closed expandable body 4 which contains an electrolytic fluid 15. A screw 10 having a seal 11 disposed thereon is in threaded engagement with a fixed part of the grease box and has a galvanic element 12, capable of producing pressure gases in the electrolytic fluid, attached to its lower end. The galvanic means generally includes one or more galvanic elements. Each galvanic element comprises a pair of dissimilar materials, preferably metals, which are conductively connected to each other and function as a negative and positive electrode, respectively. When the galvanic element is brought into contact with the electrolyte within the expansion chamber, a gas generating reaction results. The pressure resulting from gas generation causes the expandable hollow body 4 to increase in volume and to act to effect displacement of lubricant to the contact point. Thus, element 12 can be advanced into the electrolytic fluid 15 by tightening down the screw 10. The gases produced expand the hollow body 4 and dispense lubricant out of the grease box 2 to the lubrication point.

The expandable hollow body 4 engages a dividing insert, comprising parts 17 and 18, each of which have a generally circular shape and roughly conform to the interior dimension of the grease box 1. The two parts 17 and 18 of the dividing insert can be made of sheet material or similar gas-tight material. They are assembled prior to being fitted to the grease box 1 and are joined securely to one another along a reinforcing seam 20.

The dividing insert is guided slidingly and sealingly with respect to the cylindrical inner wall 21 of the grease box 1 by means of the lip seal 19. Oil is preferably located as a sealing means or medium between the dividing insert and the expandable hollow body 4. This helps to provide efficiency of movement when the expandable hollow body 4 is expanded through generation of gas under pressure within that body. As the lubricant, e.g., grease, is dispensed, the dividing insert with the lip seal moves down toward the exit defined by passage 29. The lowermost portion of the grease box is constructed of a funnel-shaped member made of a transparent material. This funnel-shaped member is identified by reference numeral 23. It is formed to provide a threaded exterior to be attached to a mechanical part to position the grease box for dispensation of the grease or other lubricant to the part to be lubricated over a period of time. Within the threaded exterior is a chamber containing a ball 25 which is spring biased by spring 27 against a narrow opening in fluid communication with the grease disposed between the element 18 and the upper wall of the transparent funnel-shaped member 23. The ball 25 is seated therein at 26 but, it should be understood, is movable. There are provided support members disposed within the channel, said members being members 28. Suitably, there is provided a removable plastic thread lug 29 which is removable when the casing is filled and is ready for insertion into the device to be lubricated.

When the grease is substantially all used up, the bottom wall 24 of the body insert nears and eventually comes into contact with the transparent funnel-shaped end part 23, providing a visible indication of the necessity of replacing the grease or other lubricant therein.

Thus, it can be seen that, pursuant to the present invention, there is provided an inexpensive, effective means for insuring that the gas generated within chamber 15 is effectively used and is maintained in out-of-contact relationship with respect to grease disposed therebeneath. Similarly, this provides an advantage in allowing the user to know exactly the state of residual grease within the grease chamber when used in association with a transparent bottom wall or, for that matter, transparent side wall.

Other advantages will be apparent to one skilled in the art from the above disclosure.

In view of the teachings above, it can be readily seen that other means for accomplishing the results to which the present invention is directed can be provided. Thus, it must be said that the terms and expressions used herein have been used as terms and expressions of description and not of limitation, and that there is no intention of excluding any equivalents, or portions thereof, as various modifications and departures from the above disclosure will be apparent to one skilled in the art.

What is claimed is:

1. In a grease box comprising a casing having a closed expandable hollow body therein, said hollow body containing electrolytic fluid into which a galvanic element is advanceable to produce gas under pressure to effect expansion of said hollow body which, in turn, effects dispensation of a lubricant out of a chamber in said grease box, the improvement which comprises a slidingly displaceable insert within said casing comprising a gas tight lip seal, said lip seal disposed between a portion of said expandable hollow body and said casing, means to maintain said lip seal in sliding position within said casing, said insert engageable by the expandable wall of said hollow body and movable in response to forces of expansion on the walls of said hollow body.

2. An improvement according to claim 1 wherein at least a part of the grease box is made of a transparent material.

3. An improvement according to claim 2 wherein the portion of the grease box made of transparent material is a funnel-shaped bottom wall provided with an opening for dispensation of grease from said grease box to the point of lubrication.

4. An improvement according to claim 1 wherein a plurality of parts comprising said insert are held together by a reinforcing seam and the lip seal lies between said plurality of parts.

5. An improvement according to claim 1 wherein the dividing insert comprises a number of parts and that part of the insert coming in contact with lubricant is sprung into the other parts of said insert.

6. An improvement according to claim 1 wherein said lip seal is positioned in said casing between an overlying generally circular member slidingly engaging the interior side walls of said casing and an underlying generally circular member slidingly engaging the interior side walls of said casing.

* * * * *

Disclaimer

3,842,939.—*Roland Satzinger*, Euerdorf, Germany. GREASE BOX FOR DISPENSING LUBRICANT. Patent dated Oct. 22, 1974. Disclaimer filed Feb. 2, 1984, by the assignee, *Gebhard Satzinger Metallwarenfabrik*, Bad Kissingen, Germany.

Hereby enters this disclaimer to claims 1 and 4–6 of said patent.
[*Official Gazette April 10, 1984.*]